(12) United States Patent
Covington et al.

(10) Patent No.: US 8,837,092 B2
(45) Date of Patent: Sep. 16, 2014

(54) MAGNETIC ELEMENT WITH BIASING STRUCTURE DISTAL THE AIR BEARING SURFACE

(75) Inventors: Mark William Covington, Edina, MN (US); Dimitar Velikov Dimitrov, Edina, MN (US); Dian Song, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/538,990

(22) Filed: Jun. 29, 2012

(65) Prior Publication Data

US 2014/0004386 A1 Jan. 2, 2014

(51) Int. Cl.
*G11B 5/39* (2006.01)

(52) U.S. Cl.
USPC ... 360/324; 360/315; 360/324.1; 360/324.12; 360/324.2; 360/327.1

(58) Field of Classification Search
USPC .......... 360/324.1, 324.12, 327.1, 324, 324.2, 360/315
See application file for complete search history.

(56) References Cited

U.S. PATENT DOCUMENTS

| | | | |
|---|---|---|---|
| 5,515,221 A | 5/1996 | Gill et al. | |
| 5,576,914 A | 11/1996 | Rottmayer et al. | |
| 5,818,685 A | 10/1998 | Thayamballi et al. | |
| 6,256,176 B1 | 7/2001 | Mao et al. | |
| 6,597,546 B2 | 7/2003 | Gill | |
| 6,667,862 B2 | 12/2003 | Zhu | |
| 6,700,760 B1 | 3/2004 | Mao | |
| 6,847,510 B2 * | 1/2005 | Childress et al. | 360/324.2 |
| 6,914,759 B2 | 7/2005 | Chen et al. | |
| 7,035,062 B1 | 4/2006 | Mao et al. | |
| 7,093,347 B2 | 8/2006 | Nowak et al. | |
| 7,236,333 B2 | 6/2007 | Macken | |
| 7,333,304 B2 | 2/2008 | Gill et al. | |
| 7,606,007 B2 | 10/2009 | Gill | |
| 7,623,324 B2 | 11/2009 | Honda et al. | |
| 7,876,534 B2 | 1/2011 | Chou et al. | |
| 7,894,166 B2 * | 2/2011 | Yamazaki et al. | 360/324.11 |
| 8,015,694 B2 | 9/2011 | Carey et al. | |
| 8,144,437 B2 | 3/2012 | Miyauchi et al. | |
| 8,390,963 B2 * | 3/2013 | Dimitrov et al. | 360/319 |
| 8,553,369 B2 | 10/2013 | Song et al. | |
| 2002/0051380 A1 | 5/2002 | Kamiguchi et al. | |
| 2002/0114111 A1 | 8/2002 | Zhu | |
| 2004/0160700 A1 | 8/2004 | Kagami et al. | |
| 2005/0063100 A1 * | 3/2005 | Kautzky et al. | 360/313 |
| 2005/0264944 A1 | 12/2005 | Fontana et al. | |
| 2006/0044701 A1 | 3/2006 | Funayama | |
| 2006/0092582 A1 | 5/2006 | Gill et al. | |
| 2006/0230601 A1 | 10/2006 | Gill et al. | |
| 2006/0232893 A1 | 10/2006 | Gill et al. | |

(Continued)

FOREIGN PATENT DOCUMENTS

| | | |
|---|---|---|
| JP | 2000-113416 A | 4/2000 |
| JP | 2012-119053 A | 6/2012 |

*Primary Examiner* — Craig A. Renner
*Assistant Examiner* — Carlos E Garcia
(74) *Attorney, Agent, or Firm* — Hall Estill Attorneys at Law

(57) ABSTRACT

An apparatus can be generally directed to a magnetic stack having a magnetically free layer positioned on an air bearing surface (ABS). The magnetically free layer can be biased to a predetermined magnetization in various embodiments by a biasing structure that is coupled with the magnetically free layer and positioned distal the ABS.

17 Claims, 5 Drawing Sheets

(56) References Cited

U.S. PATENT DOCUMENTS

| | | |
|---|---|---|
| 2006/0245117 A1 | 11/2006 | Nowak et al. |
| 2007/0139820 A1* | 6/2007 | Carey et al. .................. 360/126 |
| 2007/0230066 A1* | 10/2007 | Gill ............................. 360/324.1 |
| 2008/0094761 A1* | 4/2008 | Freitag et al. ............. 360/324.12 |
| 2008/0180863 A1* | 7/2008 | Gill ............................. 360/324.2 |
| 2009/0034132 A1 | 2/2009 | Miyauchi et al. |
| 2009/0034133 A1 | 2/2009 | Miyauchi et al. |
| 2009/0109580 A1 | 4/2009 | Ayukawa et al. |
| 2009/0130491 A1* | 5/2009 | Ohta et al. ................. 428/811.2 |
| 2009/0154025 A1 | 6/2009 | Carey et al. |
| 2009/0168241 A1 | 7/2009 | Mochizuki et al. |
| 2009/0180217 A1 | 7/2009 | Chou et al. |
| 2009/0262465 A1 | 10/2009 | Hatatani et al. |
| 2009/0279213 A1 | 11/2009 | Wu et al. |
| 2010/0027167 A1 | 2/2010 | Gill et al. |
| 2010/0039734 A1 | 2/2010 | Hara et al. |
| 2011/0069417 A1* | 3/2011 | Kawamori et al. ........... 360/319 |
| 2011/0228428 A1* | 9/2011 | Dimitrov et al. .............. 360/320 |
| 2011/0310513 A1* | 12/2011 | Dimitrov et al. .............. 360/319 |
| 2012/0063035 A1* | 3/2012 | Childress et al. ............. 360/319 |

* cited by examiner

MAGNETIC ELEMENT WITH BIASING STRUCTURE DISTAL THE AIR BEARING SURFACE

SUMMARY

A magnetic element may be constructed as a magnetic stack having a magnetically free layer positioned on an air bearing surface (ABS). Various embodiments can bias the magnetically free layer to a predetermined magnetization by a biasing structure coupled with the magnetically free layer and positioned distal the ABS.

DETAILED DESCRIPTION

Increasing emphasis is being placed on data storage devices with heightened data capacity and faster data transfer speeds. The ability to provide such increased data storage performance can correspond to reduced data access element size, such as data transducing elements and data media tracks. However, reducing the shield-to-shield spacing of a magnetic element can pose a number of operation and construction issues like increased sensitivity to process and design variables, such as data reader width and length. While data reading elements like trilayer magnetic stacks have advanced towards more conservative sensitivity to design and process variations, difficulties remain for advancement of reduced form factor magnetic elements with reliable magnetic and thermal stability as well as design and process sensitivity. Hence, there is a growing demand in the industry for advancement of reduced form factor data access elements.

As an example of some of the current difficulties facing reduced form factor magnetic elements, a trilayer magnetic element that has multiple magnetically free layers can have a reduced shield-to-shield spacing due at least in part to the lack of a pinned magnetic reference structure increasing element thickness, but can be susceptible to stability and volatile sensitivity to process and design variations.

Various configurations of a trilayer magnetic element can increase stability and sensitivity issues at element widths above 18 nm. In yet, reducing element width below the 18 nm threshold can pose difficulties with providing enough demagnetization energy to bring one or more of the magnetically free layers of the trilayer element into a quiescent state. Such demagnetization energy behavior can create highly negative element asymmetry where negative magnetic field produces large response and positive magnetic field produces minimal response. Hence, industry is specifically emphasizing a less than 18 nm width element that controls demagnetization energy and element asymmetry.

In an effort to provide such a magnetic element, a magnetic stack can be configured with a magnetically free layer positioned on an air bearing surface (ABS) and biased to a predetermined magnetization by a biasing structure. While not limited to a particular design, the biasing structure may be recessed from the ABS and coupled to the magnetically free layer distal the ABS. The coupling of the bias structure to the magnetically free layer at a position recessed from the ABS can maintain a reduced shield-to-shield spacing while providing magnetic bias that aids in getting the magnetic stack to a quiescent state.

Figure 1:
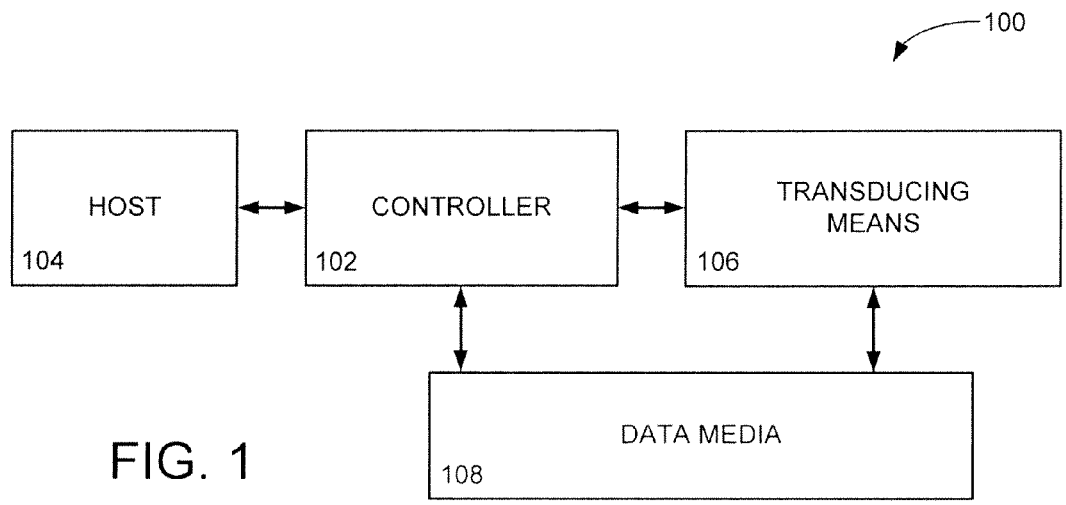
FIG. 1 is a block representation of an example data storage device capable of being used in various embodiments herein.

While a magnetic element utilizing a biasing structure can be used in an unlimited number of environments, FIG. 1 generally illustrates a block representation of an embodiment of a data storage device 100. The device 100 may have at least a controller 102 that is in communication with a host 104, transducing means 106, and data media 108 to program data to and retrieve data from the data media 108. As an example, the controller 102 can control a spindle motor aspect to rotate the data media 108 while positioning the transducing means 106 over at least one data bit portion of the data media 108 to read to and write data from the host 104.

It should be noted that the controller 102, host 104, transducing means 106, and data media 108 are each capable of being configured as a variety of different components. For example, the transducing means may be one or more data transducers (read/write heads) that are each supported by a head gimbal assembly (HGA) and adapted to fly over the data media 108 on an air bearing generated by the rotation of the media itself. Another example configuration of the transducing means is provided in FIG. 2, which provides an embodiment of a magnetic element 120 capable of being used in the data storage device of FIG. 1.

The sensor can be constructed, as shown, with a magnetic stack 122 disposed between first and second magnetic shields 124 and 126. Construction of the magnetic stack 122 is unlimited and can be a lamination of any number of layers with any magnetic orientation that is magnetically responsive. One such construction has a non-magnetic spacer layer 128, such as MgO, disposed between magnetically free layers 130 that are each directly attached to electrodes 132, which can be a variety of different orientations and materials, such as cap and seed layers.

The configuration of the magnetic stack 122 with multiple magnetically free layers 130 without a fixed magnetization to be used as a reference, a biasing magnet 134 can be positioned adjacent the stack 122 opposite from the portion that contacts an air bearing surface (ABS) 136 to impart a magnetic bias force on the free layers 130 without increasing the shield-to-shield spacing or affecting the operational characteristics of the ABS side of the free layers 130. That is, each free layer 130 can be biased by a high magnetic coercivity biasing magnet 134 to common or dissimilar default magnetizations that allow accurate sensing of data bits across the ABS 136.

The magnetic element 120 may be configured to operate as a data reader by scissoring between quiescent and activated states to sense data bits passing within the shield-to-shield spacing (SSS), along the Y axis, and within a predetermined track width 138. The magnetic shields 124 and 126 can be adapted with varying thicknesses 140 and 142 defined by a transition region 144 to block magnetic flux from outside of the track 138 while providing more room between the shields 124 and 126 to allow the biasing magnet 134 be have a wider thickness 146, along the Y axis, than the magnetic stack 122. The varying thickness magnetic shield configurations can further allow the biasing magnet 134 to be more insulated by non-magnetic material to reduce the chance of magnetic shunting from the biasing magnet 134 to the shields 124 and 126.

Figure 2:
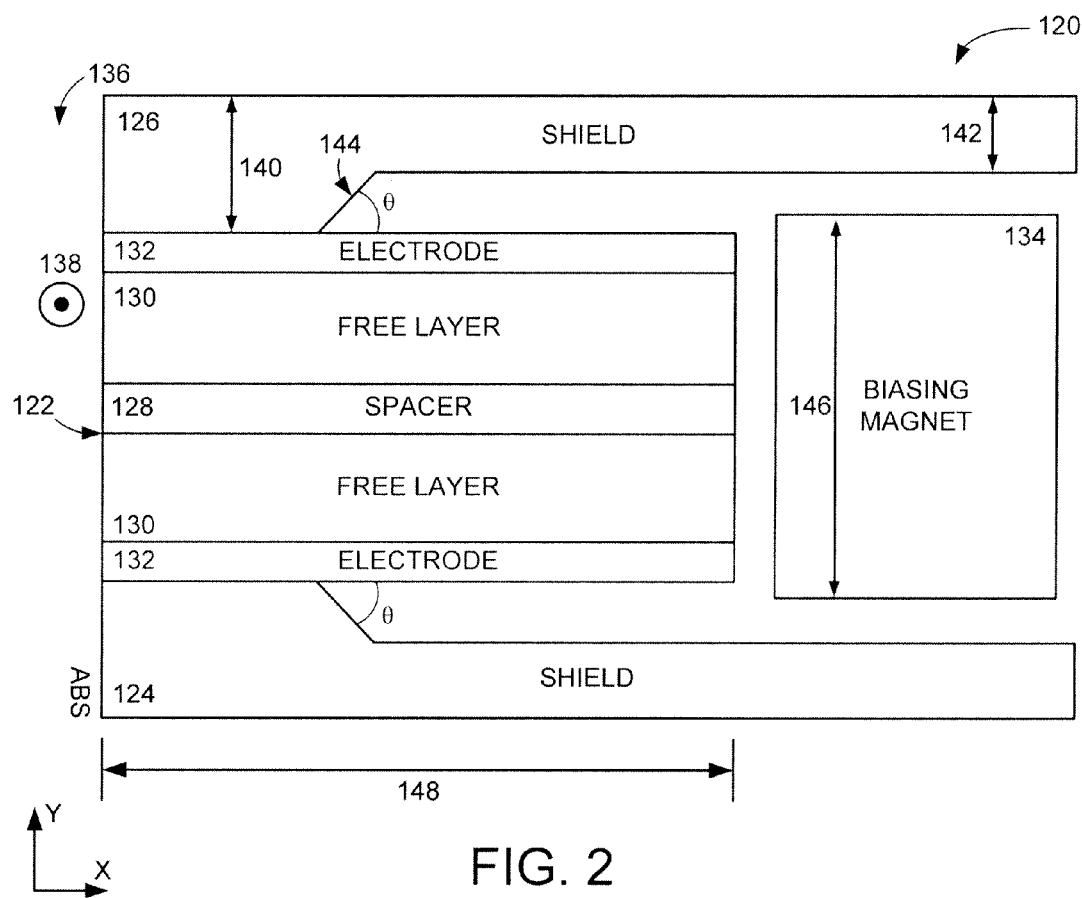
FIG. 2 shows a block representation of an example magnetic element capable of being used in the data storage device of FIG. 1.

Specifically in the embodiment displayed in FIG. 2, each magnetic shield 124 and 126 is configured with a first thickness 140 proximal to the ABS and a second thickness 142 distal to the ABS. The first and second thicknesses 140 and 142 can be connected by one or more transition regions 144 that can be shaped in an unlimited number of configurations, such as continuously curvilinear and linearly sloped at a predetermined θ degree angle with respect to the X axis, that can provide differently shaped pockets between the magnetic stack 122 and the shields 124 and 126.

The ability to tune the magnetic shields 124 and 126 with various thicknesses and shaped transition regions 144 can allow for an increased stripe height 148 for the magnetic stack 122, which can provide increased magnetic stability and reduced sensitivity to process and design variability. However, the increased stripe height 148 can reduce the efficiency of the biasing magnet 134 in setting a default quiescent magnetization in the free layers 130, especially in element widths below 18 nm.

Figure 3A:
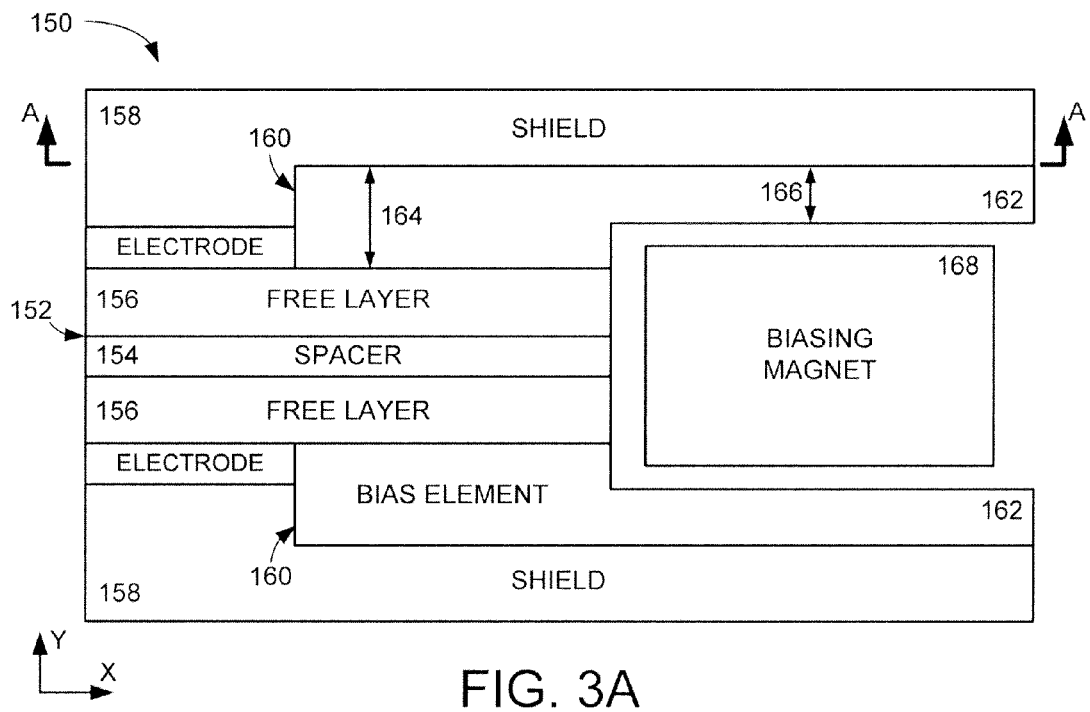
FIGS. 3A and 3B show a magnetic sensor constructed and operated in accordance with various embodiments of the present invention.
Figure 3B:
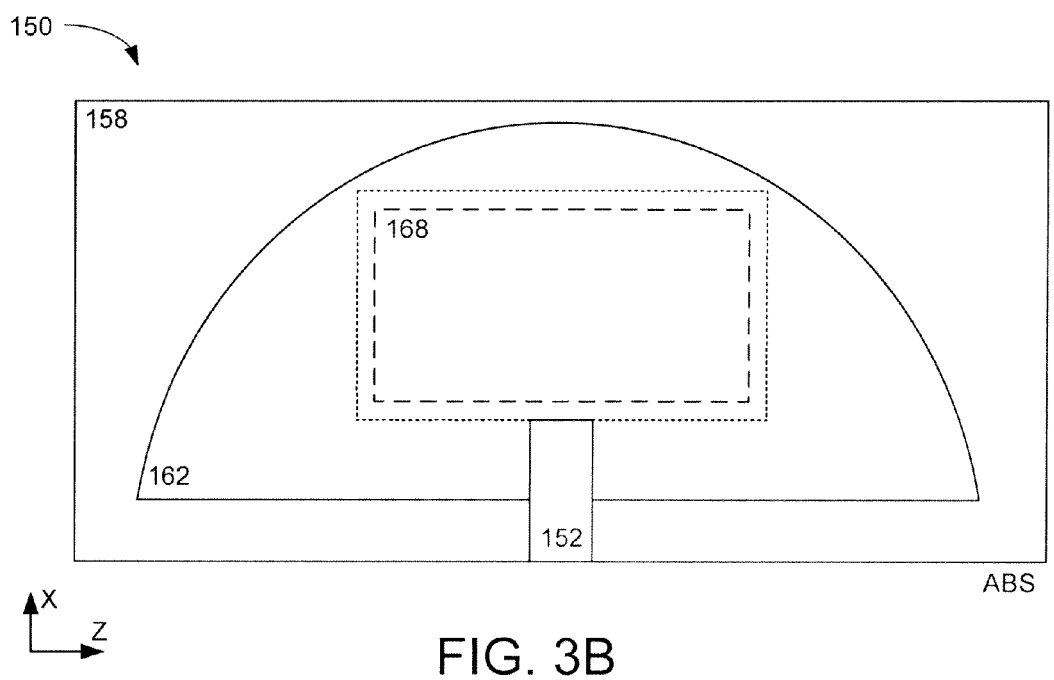

For that reason and others, the varying thickness magnetic shield, long stripe height magnetic element configuration can have increasingly stable quiescent magnetic states below 18 nm element width by partially or wholly filling the region between the magnetic stack 122 and shields 124 and 126 with a bias element. FIGS. 3A and 3B display cross-sectional and top views of an example magnetic element 150 configured with such a bias element in accordance with various embodiments. The element 150 has a magnetic stack 152 consisting of a non-magnetic spacer layer 154 disposed between magnetically free layers 156. The magnetic stack 152 may or may not include electrode layers that connect each free layer 156 to respective top and bottom shields 158.

Each shield 158 is constructed, much like the magnetic shields 124 and 126 of FIG. 2, with a transition region 160 that defines an increased shield thickness at the ABS and a reduced thickness distal the ABS. The transition region 160 further defines a beveled region between the shield 158 and free layer 156, which is partially or completely filled by a bias element 162 that continuously contacts at least the shield 158, electrode, and free layer 156. Various embodiments configure the bias element 162 to directly and continuously contact a portion of the free layer 156 distal the ABS. Such "recessed" position of the bias element 162 with respect to the ABS can provide efficient biasing of the free layer 156 without adding to the shield-to-shield spacing of the magnetic element 150.

The bias element 162 can be constructed in an unlimited number of configurations with varying materials, number of layers, and magnetic properties. In the embodiment shown in FIG. 3A, bias elements 162 consist of a single layer of material that has increased and decreased thicknesses 164 and 166 to accommodate the placement of a biasing magnet 168 adjacent to, but separated from, a rear portion of the magnetic stack 152, distal the ABS.

The combination of the biasing magnet 168 and a bias element 160 coupled to each free layer 156 allows for reliable biasing of the free layers 156 by providing contacting and non-contacting inducement of magnetic flux to set a quiescent default magnetization for each free layer 156, especially at reduced magnetic element 150 form factors. The contacting configuration of the bias elements 162 and the free layers 156 allows for the anisotropies of those components to be tuned to provide magnetic moments that easily induce a predetermined quiescent default magnetization in the free layers 156. That is, the bias elements 162 and free layers 156 can each be tuned to predetermined anisotropies that produce magnetic moments conducive to bringing the free layer magnetizations to predetermined quiescent directions.

Tuning of the free layers 156 and bias elements 162 do not require or limit the material and anisotropic properties of the respective components to the same configuration. For example, the bias element 162 can be a different material that is deposited in a different manner than the free layer 156. The point is that the configurations of the bias elements 162 and free layers 156 complement one another to efficiently and reliably achieve a predetermined quiescent magnetization in the free layers 156.

The tuning of the free layers 156 and bias elements 162 can provide ample biasing to the magnetic stack 152 and may be used without the biasing magnet 168 being present. In such a case, one or both bias elements 162 can have thicknesses that increase distal to the ABS to extend adjacent the rear portion of the magnetic stack 152. The bias elements 160 can individually or collectively be configured in a number of different manners to tune the direction and intensity of bias imparted on the free layers 156.

FIG. 3B displays an example bias element 162 configuration from the A-A cross-section of FIG. 3A. As shown, the bias element 162 is recessed so as not to contact the ABS and continuously extends from one lateral side of the magnetic stack 152 around the rear portion of the stack 152 to the opposite lateral side in a substantially semi-circle shape. While not limited to a curvilinear shape, configuring the bias element 162 with a continuously curvilinear sidewall can maximize the size of the bias element 162 on the lateral sides of the magnetic stack 152 without increasing the size of the shield 158 or magnetic element 150. It should be noted that the biasing magnet 168 is displayed in FIG. 3B as segmented lines to illustrate how the bias element 162 can continuously extend to encompass the entire areal extent of the magnet 168.

Figure 4:
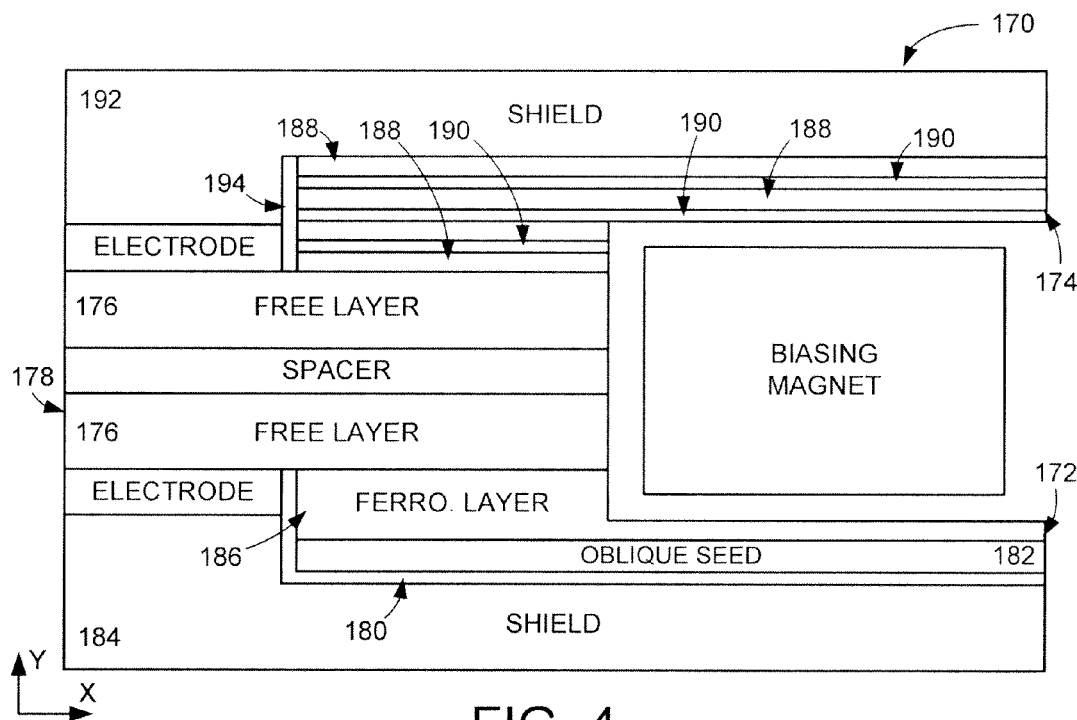
FIG. 4 generally illustrates a magnetic shield capable of deflecting unwanted flux in various embodiments.

FIG. 4 provides a cross-section representation of an example magnetic element 170 that illustrates various embodiments of how bias elements 172 and 174 can be tuned to provide predetermined magnetic moments that set free layers 176 of the magnetic stack 178 to predetermined quiescent magnetic states. As can be appreciated, the bias elements 172 and 174 of FIG. 4 are configured in different manners within the magnetic element 170. Such construction is used in various embodiments to provide different magnetic properties to the respective free layers 174.

With respect to bias element 172, an insulating material 180 separates an oblique seed layer 182 from the bottom shield 184 and an electrode layer. The oblique seed 182 can be constructed through oblique deposition techniques, such as sputtering, that deposit seed material at oblique angles to produce high uniaxial anisotropy and predetermined texture. The ability to produce such anisotropy and texture with oblique deposition provides tuning knobs that may be adjusted to provide precise tuning of the magnetic properties of the ferromagnetic layer 186 deposited thereupon and more generally the bias element 172 as a whole. An example embodiment can deposit the oblique seed layer 182 with a rough texture conducive to producing a high anisotropy ferromagnetic layer 186 that may or may not experience orange-peel coupling.

In a different manner but still providing tuned magnetic properties, the bias element 174 is configured as a lamination of alternating ferromagnetic 188 and non-magnetic layers 190 that are each separated from the electrode layer and transition region of the top shield 192 by an insulating layer 194. The number, thickness, and material composition of the ferromagnetic and non-magnetic layers 188 and 190 can each be adjusted to vary the magnetic characteristics of the bias element 174 and the manner in which those characteristics interact with the free layer 176. Hence, a magnetic element 170 can be configured with bias elements 172 and 174 configured differently to provide magnetic moments that efficiently induce the respective free layers 176 to quiescent magnetic states that may be similar or dissimilar depending on the predetermined scissoring operation of the magnetic stack 178.

Figure 5:
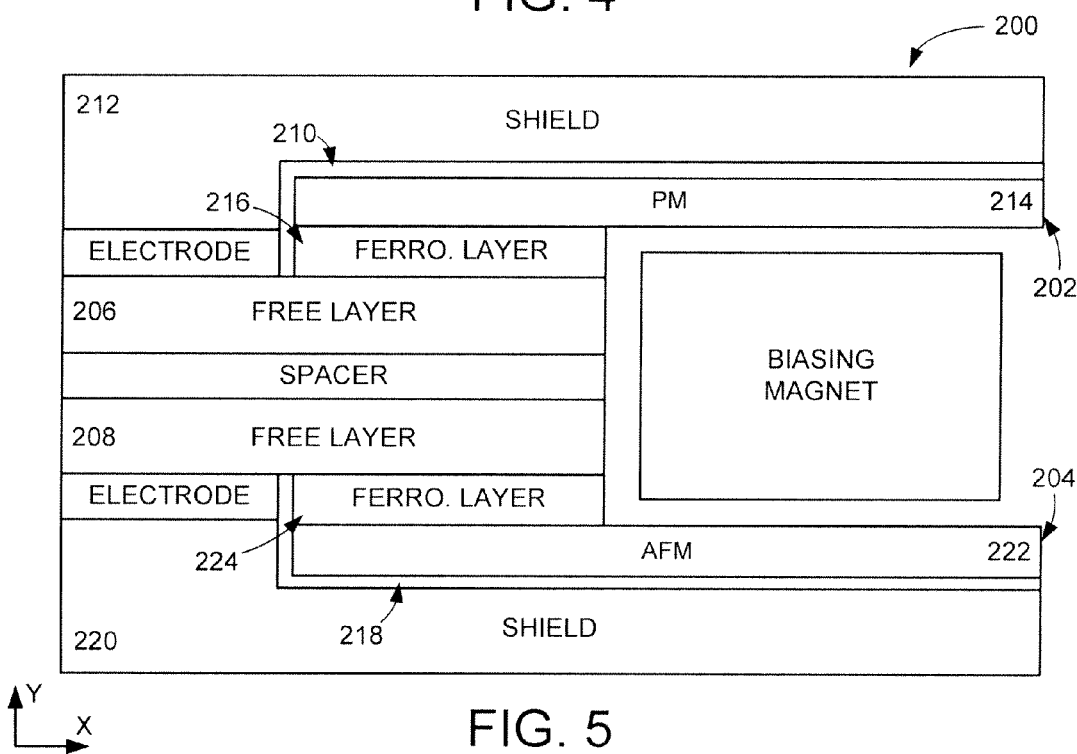
FIG. 5 provides a magnetic sensor capable of being used in the data storage device of FIG. 1.

FIG. 5 illustrates a cross-sectional representation of another example magnetic element 200 constructed in accordance with various embodiments to provide differently configured first and second bias elements 202 and 204 that are respectively coupled to portions of first and second free layers 206 and 208 distal the ABS. The first bias element 202, as shown, has an insulating layer 210 continuously extending along the top shield 212 and electrode layer. A high coercivity magnetic layer, such as a permanent magnet (PM), provides a predetermined set magnetization to a ferromagnetic layer 214 that contacts the first free layer 206.

Bias element 204 has an insulating layer 216 continuous along a bottom shield 218 similar to the bias element 202, but on the other hand is configured with an antiferromagnetic layer 220 that provides a predetermined set magnetization to a ferromagnetic layer 222 that contacts the second free layer 208. The use of high coercivity and antiferromagnetic pinning generally illustrates some of the vast array of tuning capabilities the bias elements 202 and 204 can take to provide precise predetermined magnetic properties and interactions with the free layers 206 and 208.

It should be specifically pointed out that a magnetic element may be configured with bias elements that are configured as similar or dissimilar laminations each uniquely tuned to provide predetermined magnetic moments and exchange coupling to the respective free layers. For example, bias elements contacting different free layers of a common magnetic stack can be constructed with an oblique seed layer contacting a ferromagnetic layer, such as the bias element 172 of FIG. 4, but tuned to provide different magnetic properties to induce different quiescent magnetization states in the respective free layers.

Figure 6:
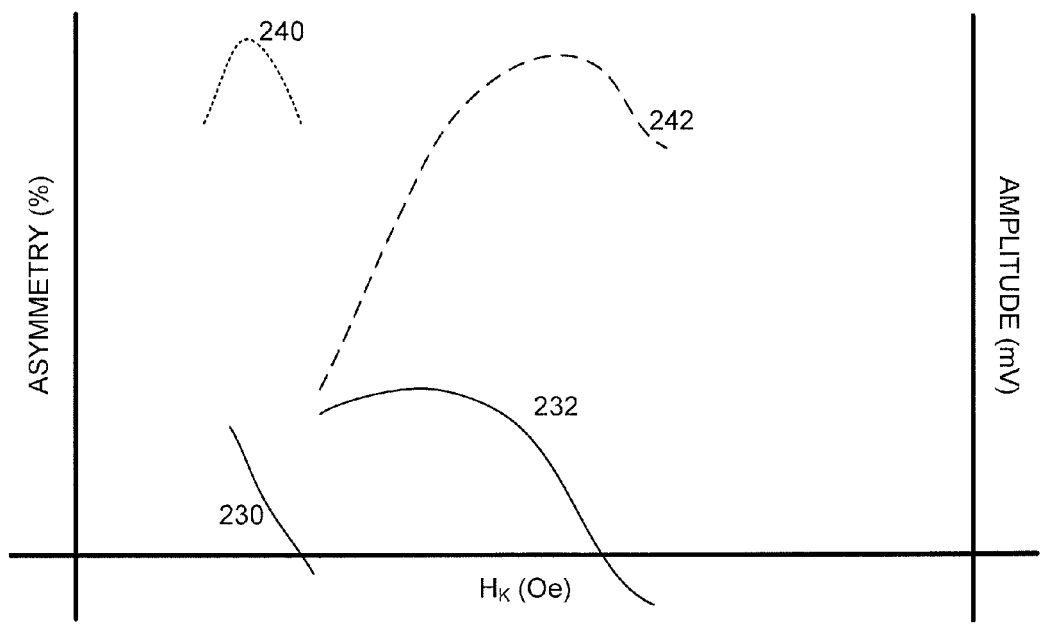
FIG. 6 shows structural characteristics of a material capable of being used as the magnetic shield in the various embodiments of FIG. 2.
Figure 7:
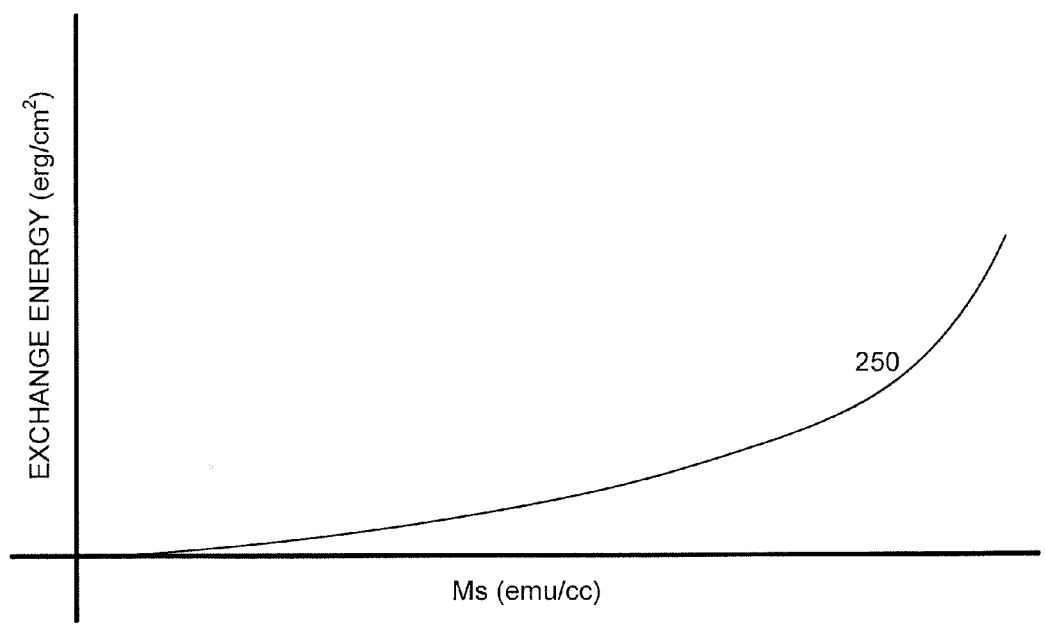
FIG. 7 displays example magnetic sensor configurations in accordance with various embodiments of the present invention.

FIGS. 6 and 7 respectively plot operational data associated with magnetic elements configured with at least one tuned bias element in accordance with various embodiments. FIG. 6 graphs asymmetry percentage and amplitude as a function of anisotropy in the aggregate of the bias element and magnetic stack free layer. Solid lines 230 and 232 correspond to the asymmetry percentage for various anisotropy and illustrate how an 800 emu/cc magnetic saturation, as shown by solid line 230, and a 1500 emu/cc magnetic saturation shown by solid line 232 provide a wide range of asymmetries that can be tuned to accommodate a number of different magnetic operating characteristics, which can be decreased with a reduction in magnetic stack form factor.

As discussed above, the anisotropy of a bias element can be tuned individually or collectively with the anisotropy of a free layer, solid lines 230 and 232 further illustrate how good sensitivity and close to zero anisotropy can be attained by tuning the anisotropy of the free layer and bias element, such as with oblique deposition. Segmented lines 240 and 242 show that the amplitude of a readback signal is greatest when the asymmetry is closest to zero. Such operation corresponds with a tuned quiescent magnetic state for a free layer correlating with maximum rotation of the magnetization of the free layer in an external magnetic field.

FIG. 7 graphs the exchange pinning energy that can be used to achieve near-zero asymmetry in various embodiments of a magnetic element. Solid line 250 displays how the use of an antiferromagnetic layer, such as layer 220 of FIG. 5, as part of a bias element lamination can produce low free layer magnetic saturation in the range of 800-1000 emu/cc with exchange energy of approximately 0.7 erg/cm$^2$ between the antiferromagnetic layer and an ferromagnetic layer of the bias element lamination.

Figure 8:
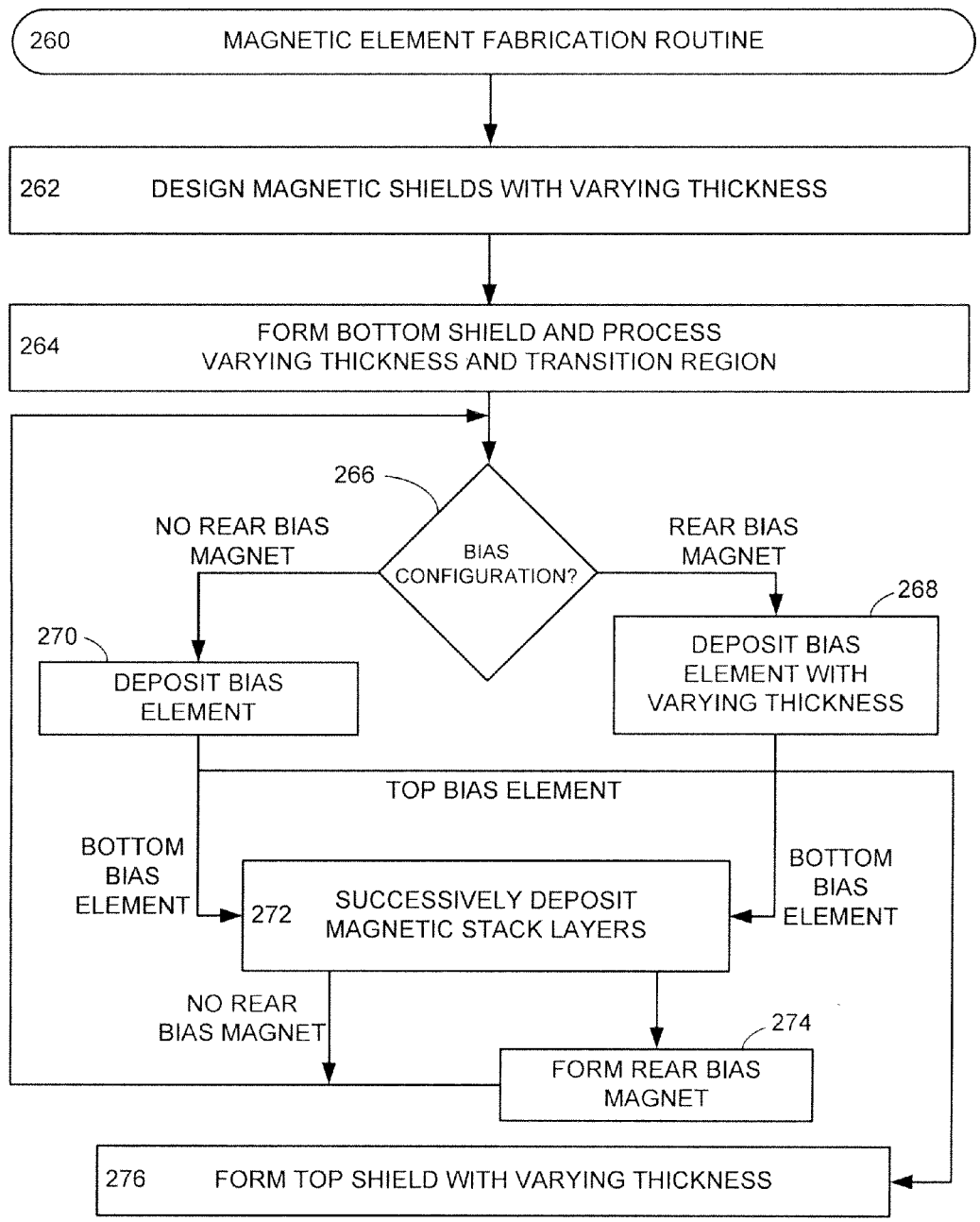
FIG. 8 provides a flowchart of a magnetic sensor fabrication routine carried out in accordance with various embodiments of the present invention.

FIG. 8 provides an example flowchart of a magnetic element fabrication routine 260 conducted in accordance with various embodiments to produce a magnetic element tuned with a predetermined bias magnetization. Initially, the routine 260 designs one or more magnetic shields in step 262 to accommodate the construction of at least one bias element. Step 262 can design at least one shield to have a transition region that defines a reduction in shield thickness distal the ABS. The chosen design of step 262 is then implemented in step 264 with the deposition and subsequent processing of a bottom shield with or without a transition region and varying thickness in accordance with the design resulting from step 262.

With the bottom shield formed, decision 266 subsequently determines how a magnetic stack portion of the magnetic element is to be biased to a predetermined quiescent magnetization. Decision 266 may contemplate the use of one or more bias elements directly contacting or separated from a free layer of the magnetic stack. If a rear bias magnet is chosen in decision 266 to be constructed onto the bottom shield, step 268 forms and processes the bias element with a varying thickness to accommodate the girth of a rear bias magnet, such as the size and position of the rear bias magnet 168 of FIGS. 3A and 3B.

Deposition of the bias element in step 268 as a single layer of material or as a lamination of multiple materials leads to an evaluation of whether the immediately formed bias element was on the top or bottom of a magnetic stack. If the bias element is contacting the bottom shield, the routine 260 proceeds to step 270 where a rear bias element is formed adjacent to, but separated from a magnetic stack that is constructed in step 272. While not limiting, step 272 successively deposits a multitude of layers to form a magnetic stack such as a trilayer stack with dual free layers and no fixed magnetic reference layer.

In some embodiments, at least one layer of the magnetic stack and rear bias magnet are concurrently deposited in step 272 and subsequently processed, such as by forming an isolation trench, to separate the stack and rear magnetic components. However, if a rear magnet is not included in the bias configuration from decision 266, step 274 deposits a bias element single layer or lamination atop the bottom magnet or magnetic stack depending on which bias element is being deposited.

That is, the bias configuration chosen in decision 266 may have bias elements contacting top and bottom free layers of the magnetic stack deposited in 272 and depending on the position of the bias element deposited in steps 268 or 274 the routine 260 either advances to deposit the magnetic stack in step 272 or forms the top shield with varying thickness in step 276. For example, routine 260 may construct a magnetic element with a single bias element lamination, such as the laminations 172, 174, 202, and 204 of FIGS. 4 and 5, with a rear bias magnet or the magnetic element can have bias elements coupled to free layers on opposite sides of the magnetic stack with or without a rear bias magnet through the steps of routine 260.

It can be appreciated that a wide variety of biasing configurations can be constructed from the routine 260 with tuned magnetic characteristics, The routine 260, however, is not limited only to the steps and decisions provided in FIG. 8 as any number of steps and determinations can be added, omitted, and modified to accommodate the fabrication of a precisely tuned magnetic element.

The configuration and material characteristics of the biasing components of the various embodiments of a magnetic element described in the present disclosure allows for increased data access performance for reduced form factor data storage devices. The combined use of varying shield thicknesses with bias elements having anisotropies tuned with anisotropies that complement a free layer of a magnetic stack provides predetermined magnetic moments that correspond with efficient and reliable return of the free layers to quiescent magnetic states. Moreover, the utilization of tuned anisotropies in the bias elements and free layers allows for reliable operation for magnetic elements below 18 nm, which corresponds with growing industry demand for smaller data access elements.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a magnetic stack having a magnetically free layer positioned on an air bearing surface (ABS) and biased to a predetermined magnetization by a biasing structure, the biasing structure coupled to both the magnetically free layer and a magnetic shield, the biasing structure continuously contacting a surface orthogonal to the ABS of the magnetic shield and having different first and second thicknesses as measured parallel to the ABS, having different first and second stripe heights as measured orthogonal to the ABS, and positioned distal the ABS.

2. The apparatus of claim 1, wherein the biasing structure comprises a lamination of alternating magnetic and non-magnetic layers.

3. The apparatus of claim 2, wherein each magnetic layer is a ferromagnetic material and one magnetic layer contacts the free layer.

4. The apparatus of claim 2, wherein an insulating layer separates the magnetic and non-magnetic layers from a transition surface of a magnetic shield.

5. The apparatus of claim 1, wherein the biasing structure is positioned in a transition region of the magnetic shield adjacent the magnetic stack, the transition region defining a reduction in thickness distal the ABS as measured parallel to the ABS.

6. The apparatus of claim 1, further comprising a second biasing structure comprising a lamination of a seed layer constructed with a predetermined roughness and a ferromagnetic layer contacting the free layer.

7. The apparatus of claim 6, wherein the predetermined roughness is formed with oblique sputtering deposition.

8. The apparatus of claim 6, wherein the predetermined roughness provides increased in-plane anisotropy for the ferromagnetic layer.

9. The apparatus of claim 6, wherein the seed layer and ferromagnetic layer have different stripe heights.

10. The apparatus of claim 1, wherein a portion of the biasing structure contacting the free layer has a biasing in-plane anisotropy that complements a stack in-plane anisotropy of the free layer to produce a predetermined magnetic torque.

11. A magnetic element comprising a magnetic stack having first and second magnetically free layers each positioned on an air bearing surface (ABS) and biased to a predetermined magnetization by respective first and second biasing structures, the biasing structures respectively coupled with the first and second magnetically free layers and top and bottom magnetic shields, each biasing structure having different first and second thicknesses as measured parallel to the ABS, having different first and second stripe heights as measured orthogonal to the ABS, and positioned distal the ABS.

12. The magnetic element of claim 11, wherein the first and second biasing structures are respectively positioned transition regions of top and bottom magnetic shields on opposite sides of the magnetic stack on the ABS, the transition regions each defining a reduction in magnetic shield thickness distal the ABS.

13. The magnetic element of claim 11, wherein the first and second biasing structures are configured as laminations comprising different layer materials.

14. The magnetic element of claim 11, wherein the first and second biasing structures are configured as laminations comprising common layer materials.

15. A sensor comprising a magnetic stack having a magnetically free layer positioned on an air bearing surface (ABS) and biased to a predetermined magnetization concurrently by a biasing structure and rear biasing magnet, the biasing structure and rear biasing magnet each recessed from the ABS, the biasing structure coupled to the magnetically free layer and a magnetic shield distal the ABS, the rear biasing magnet separated from the magnetic stack distal the ABS, the biasing structure continuously contacting a surface orthogonal to the ABS of the magnetic shield and having different first and second thicknesses as measured parallel to the ABS and having different first and second stripe heights as measured orthogonal to the ABS.

16. The sensor of claim 15, wherein the biasing structure extends from a front plane separated from the ABS and measured parallel to the ABS with first and second portions, the first portion continuously extending to a rear plane aligned with a rear surface of the magnetic stack as measured parallel to the ABS.

17. The sensor of claim 15, wherein the rear bias magnet has a bias thickness that is greater than a stack thickness of the magnetic stack.

* * * * *